United States Patent
Prochazka, Sr. et al.

(10) Patent No.: US 9,200,163 B2
(45) Date of Patent: Dec. 1, 2015

(54) SURFACE TREATMENT AGENT WITH HIGH PHOTOCATALYTIC AND SANITARY EFFECTS

(75) Inventors: Jan Prochazka, Sr., Kamenne Zehrovice (CZ); Jan Prochazka, Jr., Kamenne Zehrovice (CZ)

(73) Assignee: ADVANCED MATERIALS-JIJ S.R.O., Kamenne Zehrovice (CZ)

( * ) Notice: Subject to any disclaimer, the term of this patent is extended or adjusted under 35 U.S.C. 154(b) by 0 days.

(21) Appl. No.: 14/125,677

(22) PCT Filed: Jun. 21, 2012

(86) PCT No.: PCT/CZ2012/000054
§ 371 (c)(1),
(2), (4) Date: Dec. 12, 2013

(87) PCT Pub. No.: WO2013/000441
PCT Pub. Date: Jan. 3, 2013

(65) Prior Publication Data
US 2014/0127414 A1 May 8, 2014

(30) Foreign Application Priority Data
Jun. 30, 2011 (CZ) ............................... PV 2011-397

(51) Int. Cl.
| | |
|---|---|
| C09D 1/00 | (2006.01) |
| C09D 5/32 | (2006.01) |
| B01J 35/00 | (2006.01) |
| C09D 5/16 | (2006.01) |

(Continued)

(52) U.S. Cl.
CPC ............... *C09D 1/00* (2013.01); *B01J 21/063* (2013.01); *B01J 23/02* (2013.01); *B01J 23/04* (2013.01); *B01J 23/06* (2013.01); *B01J 35/004* (2013.01); *B01J 35/0013* (2013.01); *B01J 35/023* (2013.01); *B01J 37/04* (2013.01); *C09D 1/10* (2013.01); *C09D 5/1618* (2013.01); *C09D 5/32* (2013.01)

(58) Field of Classification Search
None
See application file for complete search history.

(56) References Cited

U.S. PATENT DOCUMENTS 8,389,022 B2  3/2013  Bignozzi
2007/0275168 A1*  11/2007  Prochazka .................... 427/314

(Continued)

OTHER PUBLICATIONS

Evonik Industries, "Aeroxide T10, p. 90" Jan. 2015.
Evonik Industries, "Aeroxide T10, p. 25" Jan. 2015.

*Primary Examiner* — Erma Cameron
(74) *Attorney, Agent, or Firm* — Andrew Wilford

(57) ABSTRACT

Surface treatment agent with high photocatalytic and sanitary effects based on $TiO_2$ nanoparticles comprising 10 to 500 g of $TiO_2$ nanoparticles per 1 liter of water, and binding ingredient A, which is an inorganic binder selected from the group comprising ZnO, MgO, CaO, $Ca(OH)_2$, $Mg(OH)_2$, $CaCO_3$, $MgCO_3$, $Na_2CO_3$, $K_2CO_3$ in the amount of 0.1 to 10% by weight related to the N weight of $TiO_2$. Agent for treatment of surfaces for application on surfaces, which comprise a minimum of 50% of substances selected from the group formed by $CaCO_3$, $MgCO_3$ ZnO, MgO, CaO, $Ca(OH)_2$, $Mg(OH)_2$ or their mixtures, where the agent contains 10 to 500 g of $TiO_2$ nanoparticles per 1 liter of water, and optionally contains a minimum of 0.1 wt % $H_2CO_3$ related to the weight of $TiO_2$.

4 Claims, 1 Drawing Sheet

(51) Int. Cl.
*B01J 37/04* (2006.01)
*B01J 21/06* (2006.01)
*B01J 35/02* (2006.01)
*B01J 23/02* (2006.01)
*B01J 23/04* (2006.01)
*B01J 23/06* (2006.01)
*C09D 1/10* (2006.01)

(56) References Cited

U.S. PATENT DOCUMENTS

| | | | |
|---|---|---|---|
| 2009/0188407 A1* | 7/2009 | Karvinen | 106/286.3 |
| 2009/0286673 A1* | 11/2009 | Omoshiki et al. | 502/159 |
| 2010/0081563 A1* | 4/2010 | Edgar-Beltran et al. | 502/62 |
| 2010/0254851 A1 | 10/2010 | Prochazka, Jr. | |

* cited by examiner

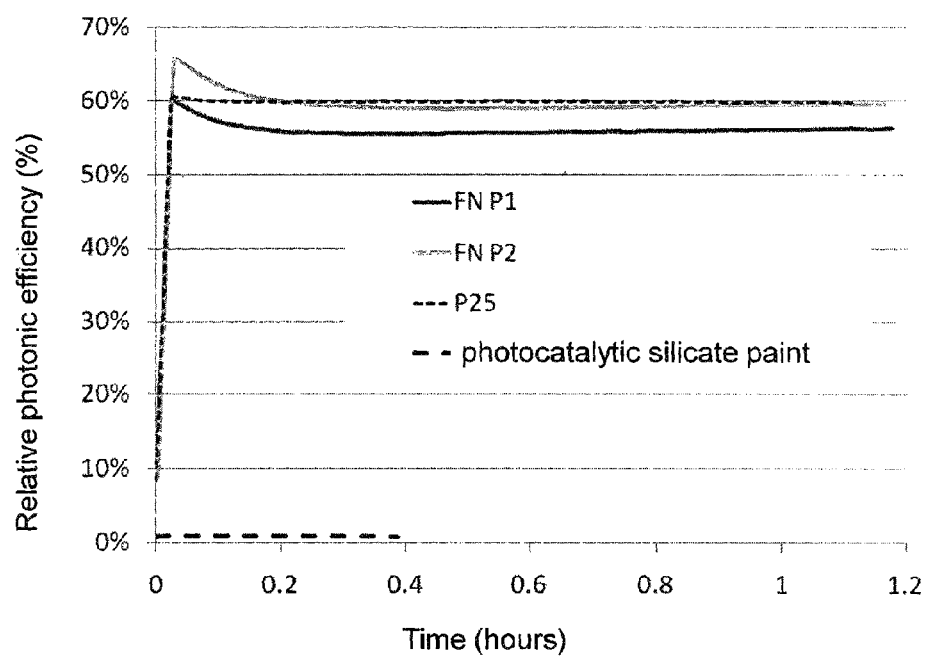

SURFACE TREATMENT AGENT WITH HIGH PHOTOCATALYTIC AND SANITARY EFFECTS

FIELD OF THE INVENTION

The invention relates to agent with high photocatalytic and sanitary effects, based on nanoparticles of $TiO_2$ and used for treatment of surfaces, and its preparation and application. By means of photocatalytic function, the agent is capable of providing self-cleaning, sanitary, antibacterial, fungicidal surface treatment of various materials, especially on building walls.

DESCRIPTION OF PRIOR ART

Modern plastic materials and ventilation systems (HVAC) are widely used in buildings, releasing of undesirable aldehydes and about two hundreds of other harmful organic substances into environment. The need to remove their side-effects becomes a necessity. Simultaneously it is important to prevent infections from spreading through the HVAC ducting throughout the building.

The fundamental function of surface treatments—paint coats and pigments—have always been in their hiding power and color. Gradually, attempts to provide the paints with more functions become common, lately. One of the historically first paints was hydrated (slaked) lime, which in its fresh form combined both, white pigment and the sanitary function. During the last decade, exploitation of the fundamental photocatalytic effect of $TiO_2$ nanoparticles has gained wide popularity. Although the efficiency of $TiO_2$ photocatalysis has been very well explored, issues concerning the implementation of $TiO_2$ into a photoactive coating material have not been satisfactorily solved until today.

The purpose of the efforts has been development of a coating composition capable to create photocatalytic surface with maximum photocatalytic efficiency and content of $TiO_2$.

When $TiO_2$ nanoparticles are mixed into the silicate inorganic paints, typical result is that the surface of nanoparticles is covered by silicon oxide thus blocking the desired photocatalysis. Another most common way of incorporation of $TiO_2$ nanoparticles into the coating composition is to mix them directly into acrylic paint. The issue is in the photocatalytic aggressiveness of $TiO_2$ nanoparticles, which photochemically decompose and literally burn the surrounding organic acrylate. The result is strong chalking and also yellowing of such paint. Addition of $TiO_2$ and stable polymers into the paint makes the issue less intensive but it does not solve completely.

Using $TiO_2$ nanoparticles in the silicone based paint compositions has again limitations, since silicones, similar to silicates, effectively block the $TiO_2$ surface and thus the photocatalysis as such.

In all coating materials with photocatalytic effect based on $TiO_2$ nanoparticles that have been developed so far, $TiO_2$ nanoparticles get covered by some ingredients of the coating material. This results in a significant reduction of the photocatalytic capability to eliminate organic substances, especially smoke, exhalations, or solvents, such as aldehydes, which are released by plastic materials, new furniture and similar.

Multifunctional coatings according to the Czech patent 300735 (WO2009/074120) contain up to 90% of $TiO_2$ and show significantly higher photocatalytic efficiency. The Czech patent 300735 describes paint with photocatalytic and sanitary effects based on $TiO_2$ nanoparticles. The paint is composed of highly porous material created by reaction of at least two ingredients, while $TiO_2$ nanoparticles are captured on the surface of the porous material (binder). The first component is an insoluble compound of calcium and the second component is a sulfate soluble in water.

For comparison, we present tests of hexane photodegradation on the FN®2 coating applied on a roof tile according to the CZ patent 300735:

Hexane concentration when the experiment commenced was approx. 700 ppm (injection of 10 microliters). The experiment was running in several stages: 20 min darkness and next 50 min exposure to UV-A. Hexane degradation was monitored by gas chromatography, and it was compared with the degradation rate on pure nano $TiO_2$—Degussa P25 (5 g $TiO_2/m^2$), which represents the theoretical maximum.

Hexane degradation rate according to the GC was:
nano $TiO_2$—Degussa P 25—4.1 $mmol/h/m^2$;
coating FN®2—2.4 $mmol/h/m^2$.

FN®2 coating on the roof tile surface showed 59% of the photocatalytic efficiency achieved by Degussa P25 (100%), while the weight ratio of the binder against $TiO_2$ was 22 wt %. The impact of the binder on photocatalytic efficiency is not linear and the 22 wt % of the binder decreased the efficiency of the coating by 41%, compared to the theoretical efficiency.

Common photocatalytic paints based on $TiO_2$, which use organic binders or silicates, show one order of magnitude lower photocatalytic effect than the coatings according to the CZ patent 300735. The conventional silicate photocatalytic paint, which was used as a reference sample in the diagram in FIG. 1, showed only 1.5% efficiency of $NO_x$ degradation compared to pure $TiO_2$.

In addition to the blocking effect, all mentioned coating materials and surfaces contain high portion of binders—tens of percent related to the nano $TiO_2$ content—thus further reducing the photocatalytic effect.

SUMMARY OF THE INVENTION

The disadvantages described above are removed by an surface treatment agent with very high photocatalytic and sanitary effects, which according to the invention comprises 10 to 500 g of $TiO_2$ nanoparticles per 1 liter of water, and a binding ingredient A, which is an inorganic binder selected from the group comprising ZnO, MgO, CaO, $Ca(OH)_2$, $Mg(OH)_2$, $CaCO_3$, $MgCO_3$, $K_2CO_3$ or $Na_2CO_3$ in the amount of 0.1 to 10 weight % related to the weight of $TiO_2$, which after application and drying creates a layer containing a minimum of 90 wt % of $TiO_2$.

The agent is prepared by the following method: $TiO_2$ nanoparticles are added into water, while intensive mixing creates suspension of $TiO_2$ in water. To this suspension a solution or suspension of a binding ingredient A is added. While mixing intensively at temperature 5 to 50° C. the suspension strongly thickens instantly after the addition.

The result is a thick, stable coating suspension of yoghurt or creamy consistence, which can be painted or sprayed on various materials, especially on building walls, where it creates a porous surface layer with the high photocatalytic effect. Efficiency of such layers is close to the theoretic values of the photocatalytic effect of pure $TiO_2$ due to the high content of $TiO_2$ nanoparticles with perfectly accessible surface.

In the case the area to be treated already comprises the binding ingredient A, especially ZnO, MgO, $Na_2CO_3$, $Ca(OH)_2$, $CaCO_3$, $MgCO_3$, which are for instance limestone walls or surfaces treated by paint with a high content of the binding ingredient A, the invention also describes a surface treatment agent with high photocatalytic and sanitary effects, which according to the invention comprises only 10 to 500 g of $TiO_2$ nanoparticles per 1 liter of water, and may optionally contains at least 0.1 wt % of $H_2CO_3$ related to the weight of $TiO_2$.

In this application, the agent may also contain the binding ingredient A.

Stability of water suspension of pure $TiO_2$, after intensive mixing at temperature 5 to 50° C., is low without the addition of binding ingredient A. Therefore the mixture requires continuous mixing during the time the agent is being applied on the wall. In contact with the binding ingredient A contained in the surface of the treated area, the agent forms bonds and holds firmly on the treated surface.

On the contrary, the stability of $TiO_2$ water suspension at the temperature 5 to 50° C., after the binding ingredient A is added is very high, as shown in Table 3, which shows sedimentation rate of different agents after 5 days. Certain substances inhibit sedimentation almost to zero, while others have no effect on sedimentation inhibiting.

The content of binders used in the agents according to the invention is absolutely minimal, and until now, a binding effect of super low concentrations of inorganic materials has never been reported. Such low concentrations of binder allow achieving the photocatalytic efficiency level of over 90%, compared with the pure $TiO_2$ active substance.

Although the binding effect must be connected with creation of surface bonds with $TiO_2$ of some kind, the circumstances or nature of this phenomenon are not entirely clear. $TiO_2$ as such is practically completely inert and the same applies to many substances mentioned in the examples. Yet, some of these substances show high binding capability, and other substances, from which one could expect forming for instance hydrogen bonds or bonds of OH groups, are absolutely inactive.

Preferably, the coating is applied on the room ceiling where it is most efficient due to the air circulation. In order to increase the deodorization efficiency and removal of various smells, especially from smoking and cooking, it is possible to increase the air turbulence near the ceiling by installing a ceiling fan and by illumination of the ceiling by UV lamps.

Cleaning and restoration of the coating's functionality is provided by occasional exposure to an intensive UV radiation source.

The photocatalytic effect of $TiO_2$ nanoparticles depends also on the thickness of the applied layer. The recommended thickness of the layer varies from 1 to 50 micrometers. Optimally, the layer thickness is 5 to 30 micrometers.

The photocatalytic effect of $TiO_2$ nanoparticles causes decomposition of organic substances on the $TiO_2$ surface, thus eliminating odours and providing antibacterial properties.

The agent, according to the invention, is used to create a surface layer, in which the surface of $TiO_2$ particles is freely accessible to the surrounding air because they are not covered by a binder, which would compromise their photocatalytic effect.

Due to the high content of $TiO_2$ in the applied layer after it dries (up to 99%), this layer shows almost identical photocatalytic effect, compared with the layer created by pure $TiO_2$.

BRIEF DESCRIPTION OF THE DRAWING

The sole FIGURE of the drawing illustrates the invention.

SPECIFIC DESCRIPTION OF THE INVENTION

The following examples demonstrate, but in no case limit, the present invention.

Example 1

$TiO_2$ nanoparticles with specific surface area 50 $m^2/g$ (Degussa P25) were mixed in water in different concentrations, corresponding to 20, 30, 50 and 100 g of $TiO_2$ per liter, and were transformed into suspension by high intensity mixing. Various amounts of saturated solution of $Ca(OH)_2$ were slowly added to these suspensions (see table 1). Concentrated solution of $Ca(OH)_2$ contains a maximum of 2 g $Ca(OH)_2$/liter, while pH of the solution is very high—14.

TABLE 1

| Active Substance | Amount (G/l) | Binding Substance | Binding Substance Amount (G/l) | Binding Substance Ratio in Solids (%) | pH |
|---|---|---|---|---|---|
| $TiO_2$ | 20 | $Ca(OH)_2$ | 1.4 | 7.0% | 9.5 |
| $TiO_2$ | 30 | $Ca(OH)_2$ | 1.4 | 4.7% | 9 |
| $TiO_2$ | 50 | $Ca(OH)_2$ | 1.4 | 2.8% | 8.5 |
| $TiO_2$ | 50 | $Ca(OH)_2$ | 1 | 2.0% | 8 |
| $TiO_2$ | 100 | $Ca(OH)_2$ | 1 | 1.0% | 6.5 |
| $TiO_2$ | 30 | $Ca(OH)_2$ + 1 g ZnO | 1 | 3.3% | 7 |
| $TiO_2$ | 50 | $Ca(OH)_2$ + 1 g ZnO | 1 | 2.0% | 7 |

When solution of $Ca(OH)_2$ was added, the agent was almost immediately getting very thick in all cases. In several cases, the concentration of $TiO_2$ was relatively very low—as low as 20 g/liter. The addition of 1-1.4 g/liter of $Ca(OH)_2$ was also very low, which indicates high binding efficiency of this substance to $TiO_2$. In two cases, a small amount of ZnO was also added in concentration 1 g ZnO/liter. The binding effect after this addition was even stronger.

These agents have very low sedimentation, almost neutral pH and they are ideal with respect to their application to various surfaces.

The photocatalytic effect of the layer, created from the agent according to the invention, was determined by degradation of the Rhodamine B dye on the surface, where it was degraded within several minutes after it was sprayed and dried.

Further, testing of photonic efficiency for conversion of $NO_x$ using the method defined in ISO 22197-1, comparing the efficiency of a film formed from the pure active substance (Degussa P25) and layers of the agent according to the invention (FIG. 1), which contained the following ratios of nano $TiO_2$ and the binding ingredient A per liter:

a) FN P1 100 g $TiO_2$+1 g $Ca(OH)_2$ (A)
b) FN P2 100 g $TiO_2$+1 g $Ca(OH)_2$+1 g nano-ZnO (A)

The agent shows a) 92.5% efficiency of the pure active substance, and even b) 99% of the pure active substance (theoretical maximum).

Both the agents a) and b) were further tested for killing a very resistant bacteria Staphylococcus aureus MRSA on the photo-active surfaces with the same composition as above:

100 g $TiO_2$+1 g $Ca(OH)_2$ (A)
100 g $TiO_2$+1 g $Ca(OH)_2$+1 g nano-ZnO (A)

The initial concentration of microbes was 100 000 CFU. After 80 minute exposure to soft UV-A radiation, the CFU concentration on exposed active surface dropped to zero. In 20 minutes, only 92 CFU survived from the initial microbe concentration on the agent a) and 46 CFU on the agent b). Both agents are highly efficient, but the efficiency of agent b) is slightly higher.

The efficiency of the applied layer may be multiplied by turbulent air circulation and by high intensity of light, e.g. by installing a lamp with a fan and a "black-light" fluorescent lamp on the ceiling. Cleaning and restoration of the paint's functionality is achieved by its occasional exposure to the source of intensive UV radiation.

Example 2

$TiO_2$ nanoparticles were mixed into water in different concentrations and were transformed into suspension by highly intensive mixing. Small amounts of the tested binding ingredients were added to these suspensions and the binding effect of these, often completely inert, substances was monitored. Final concentrations of the suspensions were 20 to 300 g of $TiO_2$ per liter and the addition of binding ingredients typically amounted only 1 to 2 g/liter.

The list of substances that were subject to testing of their binding effect are in the Table 2. Some of the substances functioned immediately, and similar to the example 1, the suspensions were getting thick instantly after the binding substance was added. These agents are stable, show almost zero sedimentation, neutral pH and are ideal with respect to their very good adhesion to various surfaces. Concentrations of $TiO_2$ in the agents were 20, 30, 50, 100, 200 and 300 g of $TiO_2$ per liter, similar to the preceding example, and the tested binding substances were added in the concentration of 1 g/liter.

Some substances showed absolutely no binding effect. $La_2O_3$ was at the edge. It actually did cause thickening of the suspension to certain degree but next, the suspension sedimented rapidly. Partial but rather low effect was observed with $ZrO_2$ and beta $Al_2O_3$. Generally, one may say that no relation, which would explain the binding properties of the binding agent to $TiO_2$, was found among the individual compounds. $H_2CO_3$ made the agent very thick but after the application and drying, it shows only low binding properties. This agent, however, has an excellent adhesion to the surfaces containing substances selected from the group comprising ZnO, MgO, CaO, $Ca(OH)_2$, $Mg(OH)_2$, $CaCO_3$, $MgCO_3$, $Na_2CO_3$, $K_2CO_3$.

TABLE 2

| Active Substance | Binding substance (1 g/l) | Binding effect | pH |
|---|---|---|---|
| $TiO_2$ | $Na_2CO_3$ | yes | 7 |
| $TiO_2$ | $Na_2CO_3$ + 0.5 g ZnO | yes | 7 |
| $TiO_2$ | $K_2CO_3$ | yes | 7 |
| $TiO_2$ | LiOH | no | 10 |
| $TiO_2$ | NaOH | no | 8.5 |
| $TiO_2$ | $NH_4OH$ | no | 11 |
| $TiO_2$ | $Ca(OH)_2$ | yes | 7 |
| $TiO_2$ | $(NH_4)_2SO_4$ | yes | 6 |
| $TiO_2$ | $ZnSO_4$ | no | 5 |
| $TiO_2$ | ZnO | yes | 5.5 |
| $TiO_2$ | MgO | yes | 5.5 |
| $TiO_2$ | $Mg(OH)_2$ | yes | 6.5 |
| $TiO_2$ | $CaCO_3$ | yes | 6.5 |
| $TiO_2$ | $La_2O_3$ | no | 6.5 |
| $TiO_2$ | $ZrO_2$ | no | 5 |
| $TiO_2$ | $Al_2O_3$ Beta | no | 5 |
| $TiO_2$ | $Al_2O_3$ alpha | no | 5 |
| $TiO_2$ | $Fe_3O_4$ | no | 5.5 |
| $TiO_2$ | $Fe_2O_3$ nano-red | no | 5.5 |
| $TiO_2$ | $Fe_2O_3$ nano-yellow | no | 5.5 |

TABLE 2-continued

| Active Substance | Binding substance (1 g/l) | Binding effect | pH |
|---|---|---|---|
| $TiO_2$ | $H_2CO_3$ | yes | 5 |
| $TiO_2$ | Ethanol | no | 5 |

Table 3 shows data comparing sedimentation of suspensions with the concentrations of 100 g and 50 g of $TiO_2$ per liter. Maximum height of the column was 150 mm (testing tube height). The tubes were filled with the solutions to the brim, the necks were sealed and the suspension was left to settle for 5 days. Subsequently, the experiment was assessed by measuring the heights of columns, where the solid substances in the suspension settled.

TABLE 3

| 150 mm Suspension | Sedimentation- Column of Solids | | |
|---|---|---|---|
| Active substance | A - Binding ingredient (1 g/l) | 100 g $TiO_2$/l | 50 g $TiO_2$/l |
| $TiO_2$ | — | 15 | 10 |
| $TiO_2$ | $Na_2CO_3$ | 140 | 80 |
| $TiO_2$ | $Na_2CO_3$ + 0.5g ZnO | 150 | — |
| $TiO_2$ | LiOH | — | 18 |
| $TiO_2$ | $NH_4OH$ | 15 | 10 |
| $TiO_2$ | $Ca(OH)_2$ | 150 | 105 |
| $TiO_2$ | $(NH_4)_2SO_4$ | 150 | 130 |
| $TiO_2$ | ZnO | 150 | 105 |
| $TiO_2$ | MgO | 150 | 115 |
| $TiO_2$ | $Mg(OH)_2$ | 150 | 115 |
| $TiO_2$ | $CaCO_3$ | 150 | 120 |
| $TiO_2$ | $La_2O_3$ | 30 | 13 |
| $TiO_2$ | $ZrO_2$ | 25 | 15 |
| $TiO_2$ | $Al_2O_3$ Beta | 20 | 10 |
| $TiO_2$ | $H_2CO_3$ | 150 | 115 |
| $TiO_2$ | $MgCO_3$ | 150 | 105 |
| $TiO_2$ | Ethanol | 10 | — |

Thick suspensions of the agents were then applied on the gypsum plasterboards with an existing acrylic paint coat and the whole surface was sprayed by the solution of a red dye Rhodamine B. In the daylight, all tested surfaces decolorized by the photocatalytic degradation in several minutes.

A layer of the agent for coating, containing 100 g nano-$TiO_2$/l+1 g nano-ZnO in the thickness of 20 micrometers, was applied on walls of a room covered by acrylic paint. Immediately after application all odours in the room disappeared.

Example 3

The agent comprising only the suspension of 100 g of $TiO_2$/liter was sprayed in two layers on the outside tiling of porous limestone, creating almost transparent film 5 to 10 micrometers thick, with a slightly whitish undertone. Pure sandstone and sandstone treated with sprayed lime water were used as reference surfaces. Both of them were sprayed with the same $TiO_2$ agent. All surfaces were subsequently exposed to the external climate conditions. Layer of $TiO_2$ on pure sandstone was washed away by rain within three weeks while on other surfaces, limestone and sandstone treated with sprayed lime water, it remained almost intact. These surfaces maintain long-term self-cleaning properties.

INDUSTRIAL APPLICABILITY

Coating materials with photocatalytic and sanitary effects may be exploited as sanitary paints in hospitals, biological laboratories, offices and residential buildings, especially in rooms for allergic persons, and for deodorization in rooms and facilities, for example in restaurants. These coatings are suitable also for places, where the active surface would clean the air from car pollutions, for instance on the building façades, concrete noise-reducing barriers along roads, etc., or as a protective coating on historical objects. Advantageously, they can be used in the farms and livestock production to reduce risks of infectious diseases and epidemics in breedings.

The invention claimed is:

1. A surface treatment agent with photocatalytic and sanitary effects, the agent contains:
   water;
   10 g to 500 g of $TiO_2$ nanoparticles per 1 liter of water; and
   an inorganic binder consisting essentially of ZnO, MgO, CaO, $Ca(OH)_2$, $Mg(OH)_2$, $CaCO_3$, $MgCO_3$, $Na_2CO_3$, or $K_2CO_3$ or mixtures thereof in the amount of 0.1 to 10 wt % related to the $TiO_2$ weight content.

2. A method of making a surface-treatment agent, the method comprising the steps of:
   mixing 10 g to 500 g of $TiO_2$ nanoparticles per 1 liter of water to create a homogeneous aqueous suspension; and
   mixing the homogeneous aqueous suspension with a solution or suspension of an inorganic binder consisting essentially of ZnO, MgO, CaO, $Ca(OH)_2$, $Mg(OH)_2$, $CaCO_3$, $MgCO_3$, $Na_2CO_3$, or $K_2CO_3$ or mixtures thereof in the amount of 0.1 to 10 wt % relative to the $TiO_2$ weight content at a temperature of 5° C. to 50° C.

3. The method defined in claim 2, further comprising the step of:
   applying the agent to a surface at a temperature of 5° C. to 50° C. at a thickness of 1 to 50 micrometers.

4. The method defined in claim 2, further comprising the step of:
   applying the agent to a surface at temperature of 5° C. to 50° C. at a thickness of 5 to 30 micrometers.

* * * * *